United States Patent [19]

Jenkins et al.

[11] Patent Number: 5,348,579
[45] Date of Patent: Sep. 20, 1994

[54] WATER RESISTANT METAL PIGMENT-CONTAINING PASTE AND METHOD FOR MAKING

[75] Inventors: William G. Jenkins, Plymouth; Craig Keemer; H. Taylor Lamborn, both of Reading; Michael Curcio, Pen Argyl, all of Pa.

[73] Assignee: Silberline Manufacturing Co., Inc., Tamaqua, Pa.

[21] Appl. No.: 104,550

[22] Filed: Aug. 11, 1993

[51] Int. Cl.$^5$ .................................................. C09C 1/62
[52] U.S. Cl. .................................. 106/404; 106/403; 106/462; 106/420
[58] Field of Search ............... 106/403, 404, 419, 431, 106/462, 470

[56] References Cited

U.S. PATENT DOCUMENTS

| | | | |
|---|---|---|---|
| 3,423,229 | 1/1969 | Kompanek et al. | 106/404 X |
| 4,294,808 | 10/1981 | Wasel-Nielen et al. | 423/305 |
| 4,370,382 | 1/1983 | Salensky | 428/418 |
| 4,565,716 | 1/1986 | Williams, Jr. et al. | 427/216 |
| 4,693,754 | 9/1987 | Kondis | 106/404 |
| 4,869,754 | 9/1989 | Kawabe et al. | 106/404 |
| 5,158,610 | 10/1992 | Bittner | 106/462 |
| 5,215,579 | 6/1993 | Keemer et al. | 106/404 |
| 5,236,983 | 8/1993 | Hegedus et al. | 524/204 |

*Primary Examiner*—Karl Group
*Assistant Examiner*—Chris Gallo
*Attorney, Agent, or Firm*—Wegner, Cantor, Mueller & Player

[57] ABSTRACT

Metal pigment particles which are treated with a phosphosilicate compound show increased stability against attack by water. The particles are especially useful in aqueous coating compositions.

13 Claims, No Drawings

WATER RESISTANT METAL PIGMENT-CONTAINING PASTE AND METHOD FOR MAKING

FIELD OF THE INVENTION

The present invention is related to paste compositions containing metal pigment particles suitable for forming coating compositions, particularly aqueous coating systems. Increasingly stringent environmental regulations have required that coating systems dramatically reduce volatile organic solvent levels. One way to comply with such regulations is to use water in place of the volatile organic solvents previously used.

BACKGROUND OF THE INVENTION

In the area of coating systems utilizing metal pigment particles, aqueous systems present rather formidable difficulties. This is particularly true with respect to aluminum and zinc pigments. Thus, the metal pigment can readily react with water to generate hydrogen gas. The amount of gas generated can produce a safety hazard, creating high pressures within the composition containers. Also, the water reaction substantially diminishes the aesthetic value of metal pigments. The reaction of aluminum pigments with water can be depicted as follows:

$$2Al + 6H_2O = 2Al(OH)_3 + 3H_2(g)$$

Due to the increasing demand for aqueous systems, a number of techniques have been proposed for inhibiting the attack on the pigment particles by water. Unfortunately, most of these techniques have not provided sufficient protection.

One technique that provides inhibiting properties is the passivation of the metal pigment particles with an ionic organic phosphate as disclosed by Williams et al., U.S. Pat. No. 4,565,716, the disclosure of which is incorporated herein by reference. Another technique involves the use of compounds containing hexavalent chromium or pentavalent vanadium compounds as disclosed in Kondis U.S. Pat. No. 4,693,754, the disclosure of which is incorporated herein by reference. Other techniques include the use of organic phosphites as disclosed in Kondis et al. U.S. Pat. No. 4,808,231, the disclosure of which is incorporated herein by reference, or the use of nitroparaffin solvents. Still another technique includes the use of either (a) an ionic organic phosphate compound, for example as taught in Williams et al., U.S. Pat. No. 4,565,716, or (b) a pentavalent vanadium compound, for example as taught in Kondis, U.S. Pat. No. 4,693,754, or (c) an organic phosphite compound, for example as taught in Kondis et al. U.S. Pat. No. 4,808,231, in combination with a nitro-containing solvent such as a nitroparaffin as disclosed in Keemer et al., U.S. Pat. No. 5,215,579, the disclosure of which is incorporated herein by reference.

The treated metal pigment particles can be used to form a metal pigment paste. The treatment produces a metal pigment paste which has improved gassing stability over conventionally treated products.

SUMMARY OF THE INVENTION

The present invention is directed to metal particles which have been treated with at least one phosphosilicate pigment. The metal particles, (e.g. aluminum flakes), which have been treated with at least one phosphosilicate pigment compound are stabilized to a degree suitable for use in aqueous coating systems.

A principle object of the invention is to provide a metal flake which can be used in aqueous systems and which is resistant to hydrogen evolution.

Another object of the invention is to provide a metal flake which maintains acceptable aesthetic values and intercoat and intracoat adhesion in the paint film.

Other objects, advantages and features of the present invention will be more readily appreciated and understood when considered in conjunction with the following detailed description.

DESCRIPTION OF THE PREFERRED EMBODIMENTS

All the disclosed embodiments can be made using conventional compounds and procedures without undue experimentation.

As indicated above, the present invention is based on the discovery that certain types of phosphosilicate compounds effectively stabilize metal pigments from reacting with water, rendering the metal pigment suitable for use in water-based coatings without significant evolution of hydrogen without loss of adhesion, or degradation of optical properties. The present invention is especially useful for zinc, aluminum and bronze pigments.

Phosphosilicate pigments contain phosphorous, silicon and oxygen. Examples of phosphosilicate pigment compounds are calcium phosphosilicate, calcium strontium phosphosilicate and aluminum zirconium zinc phosphosilicate. An especially preferred compound is calcium strontium zinc phosphosilicate marketed by Halox Pigments of Hammond, Indiana, under the tradename of Halox SZP391. The amount of the phosphosilicate compound should be from 0.1% to 30%, preferably 10%, based on the metal particle weight.

Solvents for use with the phosphosilicate pigments may include mineral spirits, high-flash naphtha, glycol ethers, glycol ether acetates, nitroparaffins, alcohols, acetates, or any other solvent compatible with coating systems. The solvent may optionally include surface active agents such as surfactants, anti-foaming agents and dispersants. Among the nitroparaffins for use with phosphosilicate pigments, the lower members of the nitroparaffin series, (i.e., nitromethane, nitroethane and 1-nitropropane), are preferred on the basis of toxicological properties and availability. The solvent for use with the phosphosilicate pigments should be present in an amount of from 5% to 100%, but preferably 20% or more, most preferably 35% or more, based on the total weight of solvent in the final metal pigment paste.

A preferred method to incorporate the phosphosilicate pigment is to incorporate the phosphosilicate pigment compound by a variation of the slurry method taught in Kondis U.S. Pat. No. 4,693,754. A metal pigment particle filter cake or paste, typically containing 50% to 95%, preferably 60% to 85%, of metal pigment in a solvent, is added to a mixture composed of 15% to 94.5%, preferably 65% to 89%, of a solvent in which the phosphosilicate pigment is dispersable. The desired amount of the phosphosilicate pigment compound, typically 0.1 to 30%, preferably 10%, based on the weight of the metal particles, is added to form a reaction mixture. The said phosphosilicate pigment may first be dispersed in a solvent. Surfactants, dispersants, anti-foaming agents, etc., may also be added to the reaction mixture. The reaction mixture is agitated at a temperature of 20° C. to 100° C., preferably ambient to 80° C., for a period of time ranging from 5 minutes to 24 hours, preferably ½ to 2 hours. Solvent is then removed to obtain the desired final metal pigment particle content, typically 40% to 90%.

In addition to the treatment method described above, another technique is to introduce the phosphosilicate compound into a ball mill, along with atomized powder or foil, lubricants and solvents, etc. used to produce an aluminum pigment. Thus, the metal pigment surfaces are stabilized as they are being generated in the ball mill.

The preferred treatment processes provides excellent stability, regardless of the lubricant used in milling.

The pigment paste obtained can be used in a variety of known coating systems, as a direct replacement for currently used pastes. Examples include maintenance, general industrial, roof coating, and automotive coating systems. Thus, the paste may be used, for example, with acrylic polymer emulsions, water reducible alkyd resin systems, water reducible alkyd/melamine cross-linked systems, waterborne epoxy coatings, polyester emulsions and water reducible polyester melamine coatings.

The phosphosilicate treatment can be combined with treatment methods including the use of nitroparaffins, ionic organic phosphates, organic phosphites, heteropoly anions and vanadium compounds. The other treatment methods can be carried out before, during or after the phosphosilicate treatment.

EXAMPLES

Specific embodiments of the invention will now be further described by the following, non-limiting examples.

EXAMPLE 1

112 grams of a non-leafing aluminum paste feed SPARKLE SILVER® 5245-AR (Non-Volatile 78.2%), is slurried with 464.0 grams of mineral spirits to yield a slurry concentration of 15.2% aluminum. To this slurry 10% by weight calcium strontium zinc phosphosilicate is added, based on the weight of aluminum in the paste feed. The material is agitated for five hours, at 30° C. The slurry is then filter pressed to obtain a finished paste of 72.6% non-volatile content and then tested for aqueous stability as described below.

Comparative Example 1

137 grams of a non-leafing aluminum paste feed SPARKLE SILVER® 5245-AR is slurried with 447 grams of mineral spirits to yield a slurry concentration of 15% aluminum. In order to provide a comparative example, no calcium strontium zinc phosphosilicate is added to this slurry. The slurry is then filter pressed to obtain a finished paste of 64% non-volatile content and then tested for aqueous stability as described below.

Each of the finished pastes obtained from the above examples is incorporated into a typical aqueous general industrial coating formulation prepared according to the following procedure. Enough of each paste to yield 20.5 g of aluminum is weighed out. The paste, 41.2 g glycol ether EB, 5.1 g Texanol (supplier—Eastman), 1.03 g Patcote 519 (supplier—Patcote), 0.62 g Dow Corning 14 (supplier—Dow), 73.5 g deionized water, and 313.7 g Joncryl 537 Resin, an acrylic emulsion (supplier—Johnson Wax) are blended together to form a uniform coating.

The coating formulations are placed in a constant temperature bath at 52° C. and the gas evolved is collected in an inverted water-filled buret for 168 hours. The data are summarized in Table 1.

TABLE 1

| ALUMINUM PASTE FEED | GASSING (mls.) |
| --- | --- |
| Example 1-SPARKLE SILVER ® 5245-AR | 14.95 |
| Comparative Example 1 | 193.30 |

The data clearly show that the use of calcium strontium zinc phosphosilicate as an inhibitory pigment reduces undesirable gassing by more than an order of magnitude compared to untreated samples.

EXAMPLE 2

76.8 grams of a non-leafing aluminum paste feed SPARKLE SILVER ® 5245-AR is slurried with 502.2 grams of mineral spirits to yield a slurry concentration of 10.4% aluminum. To this slurry 1.6% by weight calcium strontium zinc phosphosilicate is added, based on the weight of aluminum paste in the feed. The material is agitated for 5 hours, at 55° C. The slurry is then filter pressed to obtain a finished paste of 76% non-volatile content and then tested for aqueous stability as described below.

EXAMPLE 3

41.6 grams of a non-leafing aluminum paste feed SPARKLE SILVER ® 5245-AR is slurried with 540.5 grams of mineral spirits to yield a slurry concentration of 5.5% aluminum. To this slurry 4.0% by weight calcium strontium zinc phosphosilicate is added, based on the weight of aluminum paste in the feed. The material is agitated for 5 hours, at 80° C. The slurry is then filter pressed to obtain a finished paste of 76% non-volatile content and then tested for aqueous stability as described below.

EXAMPLE 5

124.3 grams of a non-leafing aluminum paste feed TUFFLAKE ® 5843 (Non-Volatile 70.8%) is slurried with 429 grams of mineral spirits to yield a slurry concentration of 15.9% aluminum. To this slurry 10% by weight calcium strontium zinc phosphosilicate is added, based on the weight of aluminum in the paste feed. The material is agitated for one hour, at ambient temperature. The slurry is then filter pressed to obtain a finished paste of 73.2% non-volatile content and then tested for aqueous stability as described below.

EXAMPLE 5

124.3 grams of a non-leafing aluminum paste feed TUFFLAKE ® 5843 is slurried with 429 grams of mineral spirits to yield a slurry concentration of 15.9% aluminum. To this slurry 15% by weight calcium strontium zinc phosphosilicate is added, based on the weight of aluminum in the paste feed. The material is agitated for one hour, at ambient temperature. The slurry is then filter pressed to obtain a finished paste of 70.7% non-volatile content and then tested for aqueous stability as described below.

EXAMPLE 6

124.3 grams of a non-leafing aluminum paste feed TUFFLAKE ® 5843 is slurried with 429 grams of mineral spirits to yield a slurry concentration of 15.9%. To this slurry 20% by weight calcium strontium zinc phosphosilicate is added, based on the weight of aluminum in the paste feed. The material is agitated for one hour, at ambient temperature. The slurry is then filter pressed to obtain a finished paste of 69.2% non-volatile content and then tested for aqueous stability as described below.

The finished aluminum pastes obtained from the above examples are incorporated into general industrial aqueous coating formulations. The formulations are placed in a constant temperature bath at 52° C., and the gas evolved is collected in an inverted water-filled buret for 168 hours. The data is summarized in Table 2.

TABLE 2

| ALUMINUM PASTE FEED | EXPERIMENTAL CONDITIONS | | | | GASSING (mls.) |
|---|---|---|---|---|---|
| | REAGENT AMOUNT | TIME (Hrs.) | TEMPERATURE | SLURRY CONCENTRATION | |
| Example 2-SPARKLE SILVER ® 5245-AR | 1.6% | 5 | 55° C. | 10.4% Al | 182.15 |
| Example 3-SPARKLE SILVER ® 5245-AR | 4.0% | 5 | 80° C. | 5.5% Al | 128.15 |
| Example 1-SPARKLE SILVER ® 5245-AR | 10.0% | 5 | 30° C. | 15.2% Al | 14.95 |
| Example 4-TUFFLAKE ™ 5843 | 10.0% | 1 | Ambient | 15.9% Al | 9.40 |
| Example 5-TUFFLAKE ™ 5843 | 15.0% | 1 | Ambient | 15.9% Al | 4.80 |
| Example 6-TUFFLAKE ™ 5843 | 20.0% | 1 | Ambient | 15.9% Al | 6.70 |

The data clearly shows that different amounts of calcium strontium zinc phosphosilicate affect the amount of undesirable gassing. It can also be seen that the processing variables of time and temperature affect the level of undesirable gassing.

Each of the finished aluminum pastes of Examples 1 and 4 was incorporated into an aqueous automotive basecoat formulation. The formulations obtained were sprayed onto electrocoated steel panels, and then clear coated with a solvent-borne automotive formulation. These panels were placed in an enclosed chamber maintained at 100° F. (38° C.) and 100% relative humidity, in accordance with ASTM D2247-87. After 10 days of exposure, the panels were removed from the chamber and dried. No blistering or visual degradation was noted. The panels were then tested for adhesion, in accordance with ASTM D3359-87, Test Method B. No loss of adhesion occurred.

While there is shown and described herein certain specific examples embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shown and described except insofar as indicated in the scope of the appended claims.

The entirety of everything cited above or below is expressly incorporated herein by reference.

What is claimed is:

1. A metal pigment-containing paste suitable for formation of a coating composition, comprising:
   metal pigment particles;
   a solvent;
   and at least one phosphosilicate compound
   wherein the metal pigment particles comprise aluminum.

2. A metal pigment-containing paste suitable for formation of a coating composition, comprising:
   metal pigment particles;
   a solvent;
   and at least one phosphosilicate compound
   wherein the metal pigment particles comprise bronze.

3. The metal pigment-containing paste of claim 1, wherein the metal pigment particles are present in an amount of from approximately 40% to approximately 90% by weight of the paste.

4. The metal pigment-containing paste of claim 1, wherein the phosphosilicate compound is present in an amount of from approximately 0.1% to approximately 30.0% by weight of the metal pigment particles.

5. The metal pigment-containing paste of claim 1, wherein the amount of phosphosilicate compound is approximately 10% by weight of the metal pigment particles.

6. The metal pigment-containing paste of claim 1, wherein the solvent comprises at least one member selected from the group consisting of mineral spirits, high flash naphtha, glycol ethers, glycol ether acetates, nitroparaffins, alcohols and acetates.

7. A metal pigment-containing paste suitable for formation of a coating composition, comprising:
   metal pigment particles;
   a solvent;
   and at least one phosphosilicate compound
   wherein the metal pigment particles comprises at least one member selected from the group consisting of calcium strontium phosphosilicate, aluminum zirconium zinc phosphosilicate and calcium strontium zinc phosphosilicate.

8. The metal pigment-containing paste of claim 1, wherein the phosphosilicate compound comprises calcium strontium zinc phosphosilicate.

9. The metal pigment-containing paste of claim 1, wherein the solvent further comprises a surface active agent.

10. An aqueous coating composition comprising:
    a metal pigment-containing paste as claimed in claim 1; and
    an aqueous carrier.

11. A method of making a metal pigment-containing paste useful for forming a coating composition, comprising:
    (a) producing aluminum particles; and
    (b) contacting the aluminum particles with a phosphosilicate compound.

12. A coating composition comprising the metal pigment-containing paste made according to the method of claim 11.

13. In a painted automobile, the improvement comprising paint containing aluminum particles which have been treated with a phosphosilicate compound.

* * * * *